Dec. 29, 1953
E. J. DIEBOLD
2,664,525
SERIES CAPACITOR PROTECTION
Filed Feb. 16, 1950
5 Sheets-Sheet 1
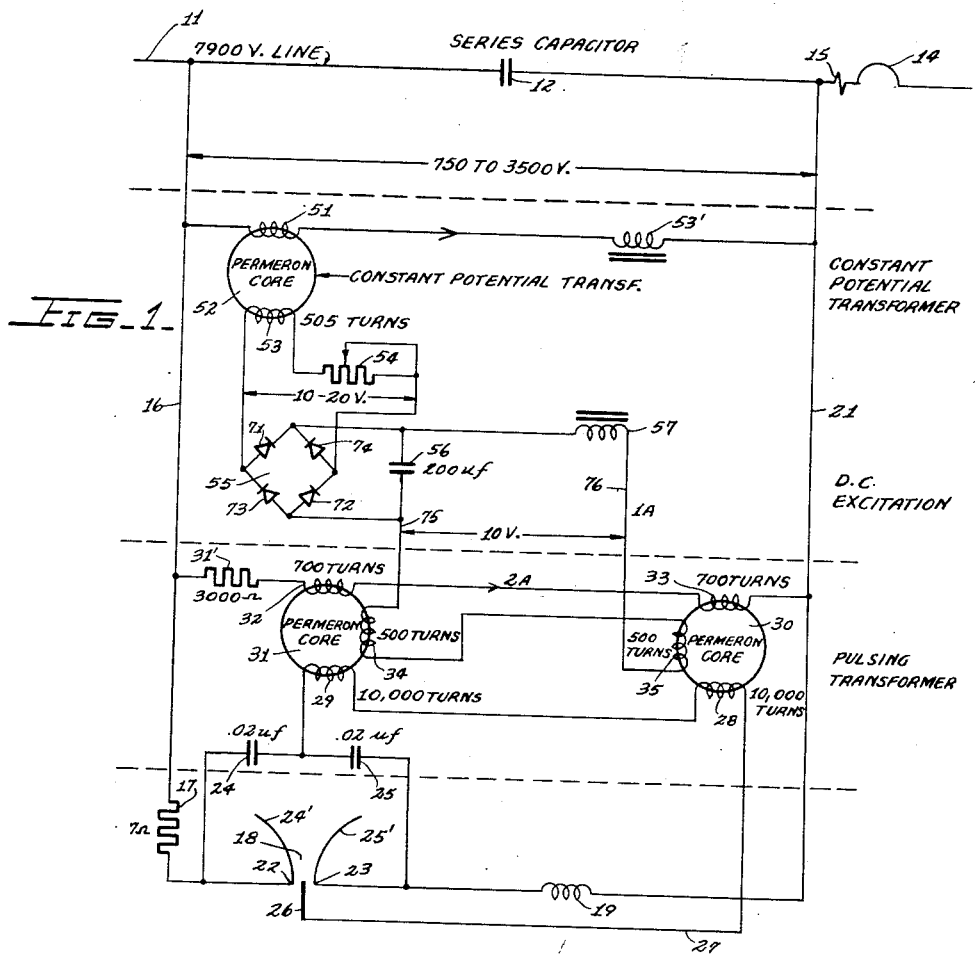
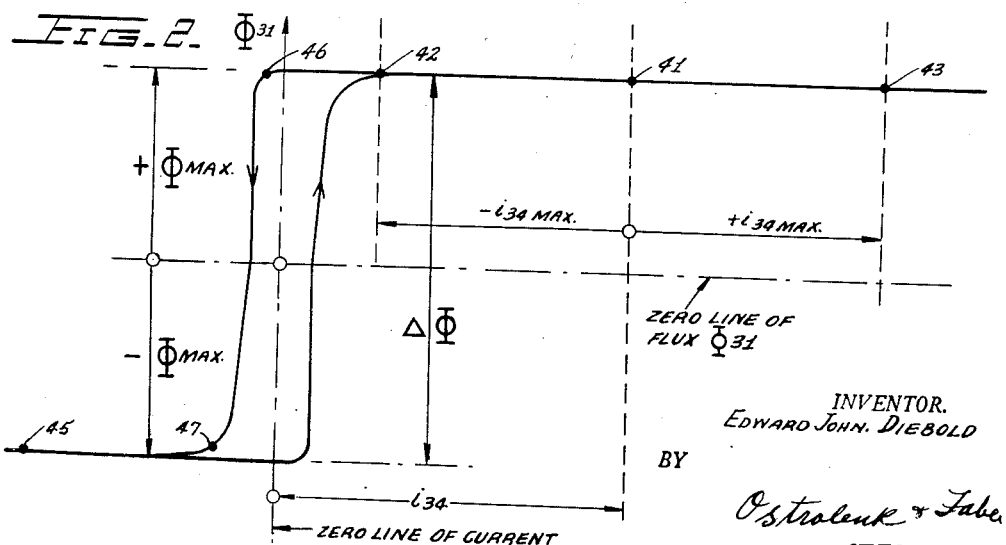
INVENTOR.
EDWARD JOHN DIEBOLD
BY
Ostrolenk & Faber
ATTORNEYS Dec. 29, 1953    E. J. DIEBOLD    2,664,525
SERIES CAPACITOR PROTECTION
Filed Feb. 16, 1950    5 Sheets-Sheet 2
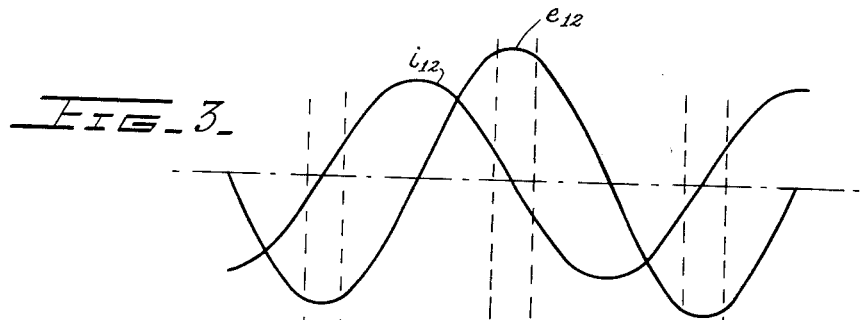
FIG-3-
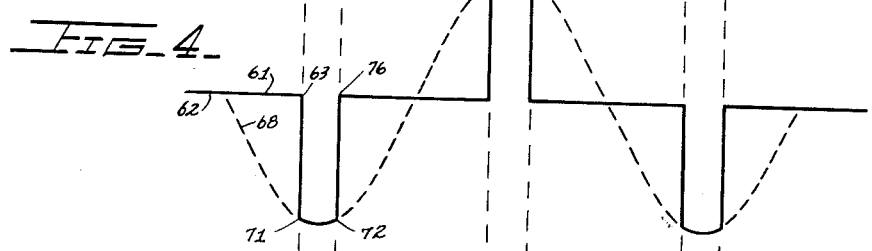
FIG-4-
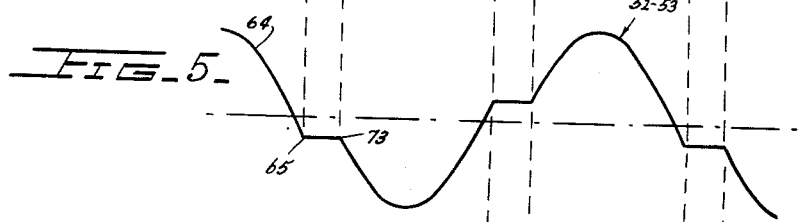
FIG-5-
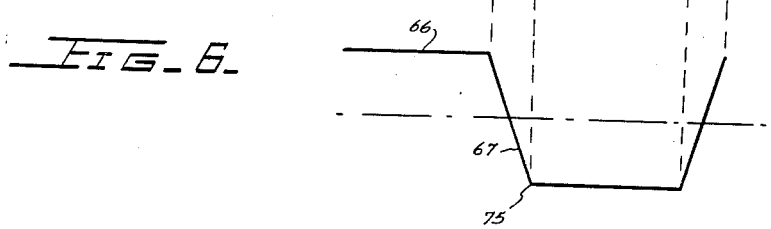
FIG-6-
INVENTOR.
EDWARD JOHN DIEBOLD
BY
Ostrolenk + Faber
ATTORNEYS

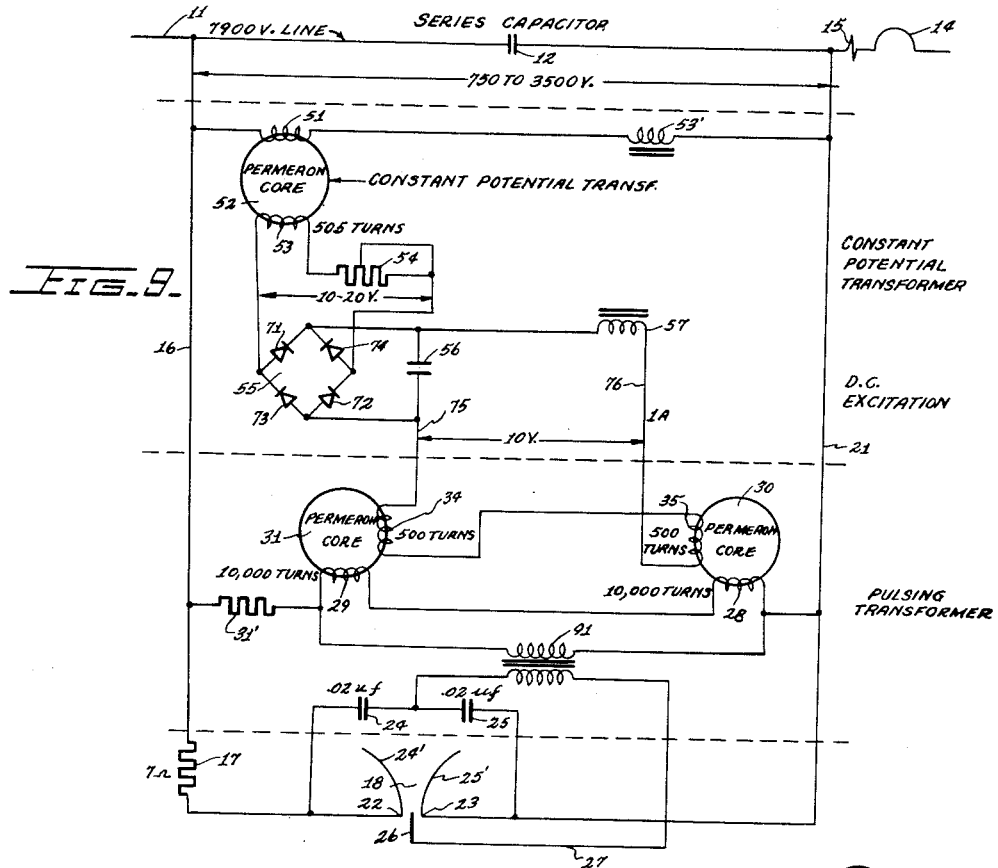

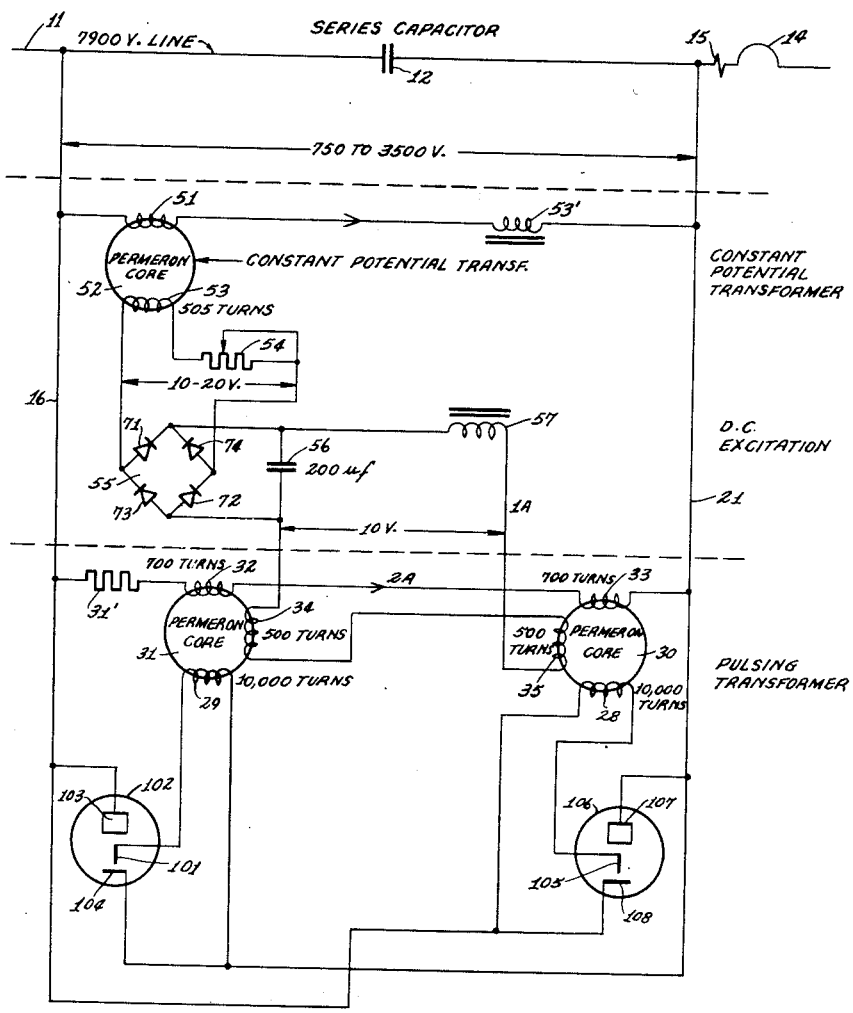

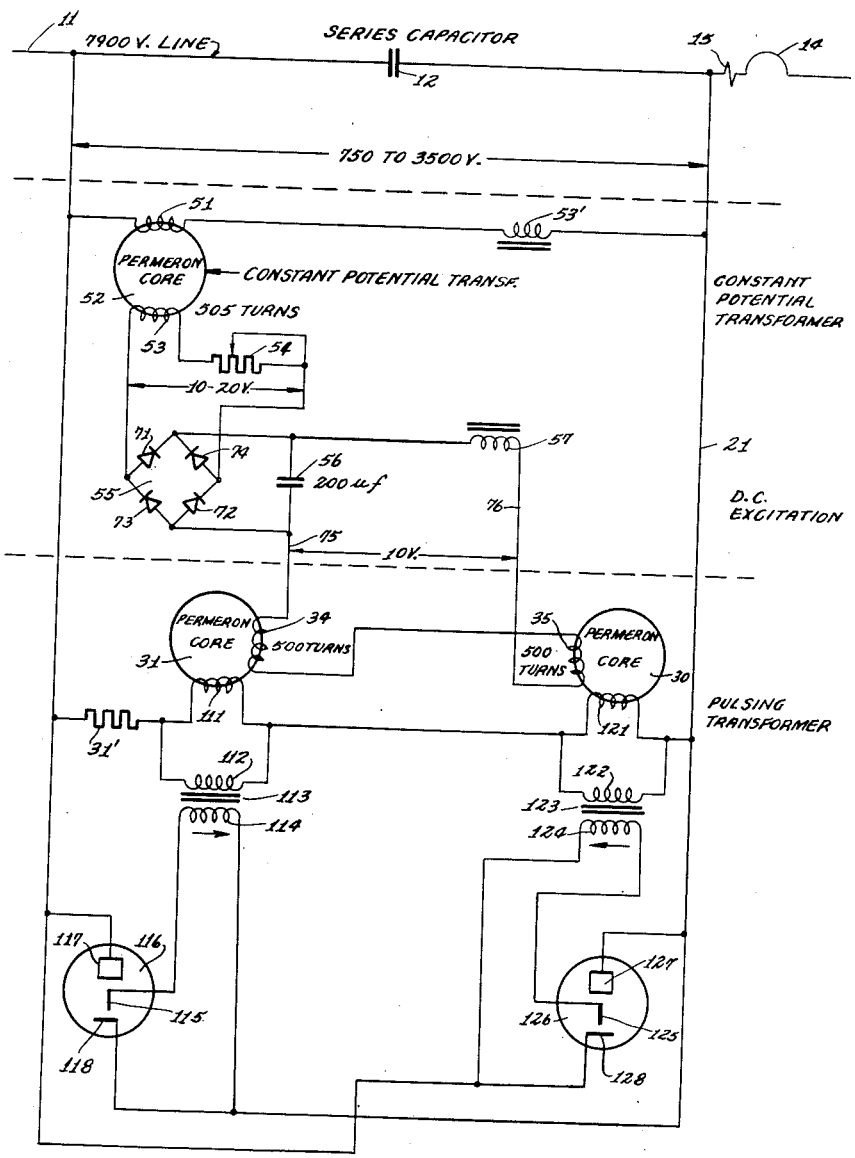

Patented Dec. 29, 1953

2,664,525

UNITED STATES PATENT OFFICE 2,664,525

SERIES CAPACITOR PROTECTION

Edward John Diebold, Philadelphia, Pa., assignor to I-T-E Circuit Breaker Company, Philadelphia, Pa., a corporation of Pennsylvania Application February 16, 1950, Serial No. 144,571

7 Claims. (Cl. 317—12)

My invention relates to a series capacitor protective system and more specifically relates to novel circuit arrangements for bi-passing a series capacitor during fault current conditions in a power line when the fault current reaches predetermined values.

As is well known in the art, series capacitors connected in power lines for power factor correction are subjected to the danger of failure of the dielectric of the capacitor due to the voltage $$\left(e = \frac{i}{\omega c}\right)$$

where $(e)$ is the voltage appearing across the capacitor $(c)$ when a fault current condition $(i)$ occurs on the line.

A capacitor is usually designed to carry a predetermined excess above a normal full load current to allow for a reasonable factor of safety. However, the required volume of the dielectric of the capacitor varies as the square of the current, and accordingly the allowable factor of safety is limited well below the values of possible fault currents that may flow in the system if the capacitor is not to be made too bulky and costly.

Accordingly it has been the practice to introduce a bi-pass circuit around the capacitor which is normally open. This bi-pass circuit is closed only when the current in the power line reaches such fault current values that the voltage developed across the capacitor would rupture the dielectric if permitted to flow through the capacitor.

In accordance with my invention, I provide a spark gap which is connected across the capacitor. So long as the current in the main line is below a predetermined value, the bi-pass circuit is maintained open at the spark gap. When, however, the current amplitude approaches the danger value at which the voltage developed across the capacitor might effect a break-down of the dielectric of the capacitor, the spark gap breaks down providing a bi-pass circuit around the capacitor.

Accordingly, an object of my invention is to provide a novel electric circuit arrangement which automatically responds to the current of the power line to insert a bi-pass circuit around a series capacitor.

A further object of my invention is to provide a circuit arrangement for effecting a bi-pass around a series capacitor which is closed only in response to pre-determined currents in the power line.

In carrying out my invention, I provide a pair of electrodes connected across the capacitor which are normally open circuited. A pulse applied at these electrodes when fault conditions occur at the capacitor effect a break down between these electrodes to provide a bi-pass circuit around the capacitor.

Accordingly, a further object of my invention is to provide novel circuit arrangement for producing voltage pulses output in response to a fault current input.

My novel system requires for its operation, a constant current output. Inasmuch as the available source of supply is the main current with its variable current flow and variable potential across the capacitor, I have provided a novel circuit for producing from this available source, a constant current supply.

Accordingly, still a further object of my invention is to provide a novel circuit arrangement for producing a constant current output.

Other objects of my invention will be apparent from the detailed description of the invention which follows, taken in connection with the drawings, in which Figure 1 is a circuit diagram of a preferred form of my invention;

Figure 2 is a hysteresis curve of the magnetic core employed in connection with my invention;

Figure 3 shows a voltage and current curve across the capacitor in the main current;

Figure 4 shows the voltage distribution of the voltage $e_{12}$ between windings 51 and 53' (Fig. 1) during each cycle;

Figure 5 shows the current wave in windings 51 and 53';

Figure 6 shows the corresponding flux in winding 51;

Figure 7 shows the biasing and superimposed current in transformers 30 and 31;

Figure 8 shows the pulse produced when the load current reaches fault value;

Figure 9 is a schematic circuit diagram of a modified form of the spark gap circuit;

Figure 10 is a still further modified form in which gas tubes are used;

Figure 11 is a still further modified form in which the gas tubes are employed.

Referring now to Figure 1, a power line 11, one phase of which is shown here for purpose of illustration, is provided with a power factor correcting series capacitor 12. The line extends from some source of power (not shown) to a load (also not shown) through a schematically shown circuit breaker 14 having the usual trip coil 15.

The voltage developed across the series capacitor varies with the current flowing in the line 11 in accordance with the relation $$e = \frac{i}{\omega c}$$

Capacitor 12 is designed to withstand voltages appearing across the condenser up to values determined by currents up to full load.

As is well known in the art, when a fault current flows the protective circuit breaker 14 is operated by the fault current responsive magnet 15 to open the circuit. However, during the short interval before the circuit breaker can open the line (several cycles in a 60 cycle system), the fault current generates a voltage across capacitor 12 sufficient to rupture the dielectric.

The present invention is directed to a circuit arrangement which is responsive to a fault current to instantaneously prevent such fault current from flowing through the capacitor and developing a rupturing voltage. To this end there is connected across the capacitor, a circuit including a conductor 16, a resistor 17, a spark gap 18, blow out coil 19, and conductor 21. The spark gap 18 in this circuit comprises the electrodes 22 and 23, each having connected thereto arcing horns 24 and 25. Interposed between the main arcing electrodes 22 and 23 is an auxiliary electrode 26.

The spark gap 18 normally provides an open circuit rendering the bi-pass normally ineffective so that under normal load conditions in the main line 11, the load current flows through the series capacitor 12. As will be explained hereinafter, this by-pass is automatically instantaneously closed under control of auxiliary electrode 26 when the current in the main line reaches fault current values.

The auxiliary electrode 26 is connected over a conductor 27 to the secondary windings 28 and 29 of the step-up transformers 30 and 31 respectively. The core of these transformers is of a very soft magnetic material with low magnetizing current. This type of reactance described in Bulletin #4809 of the I. T. E. Circuit Breaker Co. entitled "Mechanical Rectifiers" has, as is well known, a high impedance while the flux in the magnetic core is varying and has a negligible impedance when the core is saturated, i. e., when no flux variation occurs. This core material has a hysteresis loop characteristic with a steep front and saturates at a relatively low current value as shown in Figure 2. As will appear hereinafter, advantage is taken of this characteristic of this type of reactor with the core material which is truly saturable for a predetermined low current flow in the windings to produce a voltage pulse in breaking down the gap only when fault current conditions exist.

The main arcing electrodes 22 and 23 are connected through capacitors 24 and 25 respectively to the opposite terminals of the secondary 29 of transformer 31.

As will be explained hereinafter, when normal load current conditions obtain on the power line 11, the voltage across the main electrodes 22, 23 of the spark gap is insufficient to effect a breakdown of the gap and therefore the spark gap provides an open circuit and no voltage is included in the secondaries 28, 29 to produce a breakdown between either of the electrodes 22, 23 and the auxiliary electrode 26. When, however, at any instant in any cycle, a current above a predetermined value, i. e. a fault current, is flowing in the power line 11, a pulse voltage is induced in either secondary 28 or 29 (depending on the polarity of the cycle) sufficient to bring the voltage of the auxiliary electrode 26 to a value at which it breaks down between electrode 22 or 23 and current then flows over the circuit including the spark gap and the secondaries 28 and 29.

The manner in which one of the secondaries 28 or 29 is energized to prevent a breakdown voltage at 26 only when a fault current occurs in the main line is achieved by biasing the transformers 30 and 31 to saturation. It will be noted that connected across the conductors 16 and 21 is a circuit including a resistor 31 and the primary windings 32 and 33 of the transformers 31 and 30. These transformers, in addition to the primary windings 32 and 33 and secondary windings 29 and 28 (of greater number of turns) are provided with auxiliary biasing windings 34 and 35 respectively.

As will be explained more fully hereinafter, there normally flows in the auxiliary biasing windings 34 and 35, a constant direct current. Such a constant current may be secured in any of a number of well known means such as a battery supply. In the present illustration, I secure this biasing current by energy delivered at a constant rate taken from voltage drop across capacitor 12 for the full range of potentials across this capacitor.

As stated hereinbefore, the core of the transformers 30 and 31 is made of a special steel known as "Permeron" core, fully described in the Bulletin mentioned above. This special core material has a hysteresis loop characteristic such as shown in Figure 2, in which at low current values the flux change is steep. The core becomes saturated at relatively low current values and thereafter further changes in current result in no further change in flux.

By reason of the bias provided by the current flowing through the biasing windings 34 and 35, the normal flux in the core of transformers 30 and 31 is at the saturated point 41, Fig. 2.

The current therefore flowing over the circuit from conductors 16 to 21 through the primary windings 32 and 33 is determined by the voltage across capacitor 12 and the resistance of resistor 31. As the load current in line 11 fluctuates from no to full load, the voltage across capacitor 12 fluctuates correspondingly and the current flowing through windings 32 and 33 fluctuates over a maximum range from a cyclic swing to just either side of 41 (Fig. 2) to a maximum swing from 42 to 43. Accordingly such current variations as occur in the main line 11 from no load through full load because it does not extend beyond 42 (Fig. 2) result in no change in the flux of the transformers 30 and 31 and therefore normally no voltage will be induced in the secondary windings 28 and 29 as pointed out above.

At the instant, however, that the current in the main line reaches dangerous fault current values, the current oscillations in the primary windings 32 and 33 will extend beyond points 42 to, for example, 45. In this range, the flux variation in the core beginning at the current value 46 changes rapidly to the point 47 and as a result of this steep curved change in flux, a voltage pulse of short duration (.001 second) of high voltage (50,000) is induced in the secondary windings 28 or 29, depending on the polarity of the wave at the instant. This induced voltage pulse in conductor 27 is sufficient to effect break-down at the auxiliary electrode 26 of the spark gap 18.

The break-down of the spark gap between either main electrode 22, 23 and the auxiliary electrode 26 results in ionization of the spark gap between the main electrodes 22 and 23 resulting in a break-down across the main electrodes 22 and 23 and the current from the main line 11 thereupon flows over the circuit, including the conductors 16, resistor 17 (which prevents short circuit conditions at this instant), spark gap 18, blow out coil 19 and conductor 21, by-passing series capacitor 12.

In this manner, the fault current is provided with a by-pass circuit at the instant in a cycle when the fault current condition occurs and the series capacitor 12 is protected. Resistor 17, and in fact, this entire by-pass circuit, has a much lower impedance than capacitor 12 that substantially all the excess or fault current flows in this by-pass thus preventing development of any excess or dangerous voltage drop across capacitor 12.

The current will continue to flow in this by-pass circuit so long in each cycle as the fault current values are dangerously high. When in a cycle, the current approaches and passes through zero, the voltage may drop below the value necessary to maintain the arc across gap 22, 23 and the arc is extinguished. This may occur in each cycle as the current approaches zero but the arc will be reignited in the succeeding cycle if the fault current is still present. After several cycles, the circuit breaker 14 opens the line. In this manner, the by-pass circuit is automatically brought into operation when a fault occurs and is promptly opened when normal current conditions obtain.

It will be understood, as illustrated in the drawing, that the biasing windings 34 and 35 are reversed in direction with respect to each other so as to have their respective transformers 31 and 30 energized in opposed half cycles. Accordingly, if the fault occurs during the positive half of a cycle, the transformer 31, for example, becomes energized in the manner described above, and if the fault occurs during the negative half of the cycle, the transformer 30 in this illustration becomes energized.

In the circuit arrangement here shown, one terminal of winding 32 is connected to electrodes 22, 23. In order to prevent a short circuit between electrodes 22, 23, capacitors 24 and 25 are provided.

From the above, it will now be clear that the generations of a voltage to break down the arc gap only in response to a fault current in the main line depends on the flux bias in the core of the transformer 31 to a point 41 (Fig. 2) on the hysteresis loop where the transformer core is so saturated that the cycle swing of the current in the primary winding 32 over a full range of current in the main line from no load to at least full load. This bias is achieved by the constant current flow in biasing windings 34, 35.

Referring now to the circuit arrangement for achieving a constant voltage and therefore constant biasing current for the biasing windings 34 and 35, I have connected across the conductors 16 and 21, a circuit including the primary winding 51 of a transformer 52 having a core material similar to that described in connection with transformers 30 and 31. Connected in series with the primary winding 51 is an inductance 53'.

The voltage across capacitor 12, $e_{12}$ appears across this circuit including inductance 51 and 53' and may be expressed as follows:

$$e_{12} = L_{53}' \frac{di}{dt} + e_{51} \qquad (1)$$

The current flowing in this reactance circuit lags behind the voltage by 90°. Inasmuch as the core of transformer 52 is of Permeron, having a saturation characteristic curve such as shown in Figure 2, it will become saturated at a predetermined current value in each cycle.

When the load current is small, the current value at which core saturation occurs is reached relatively late in each cycle. When the load current is large, the same current value in that cycle when core saturation occurs is reached relatively early in each cycle.

During the period of each cycle when the core of transformer 52 is saturated, it presents substantially zero impedance to the voltage source and all the voltage of the source $e_{12}$ appears across the inductance 53' which has been inserted to prevent a short circuit during this period in each cycle when the transformer core is saturated.

During the remaining period of each cycle when the transformer core is unsaturated, it presents an infinite impedance to the voltage due to the high rate of change of flux. All the voltage then appears across inductance 51 but due to the high impedance, there is substantially zero current flowing in this circuit.

In Figures 4, 5 and 6, the voltage, current and flux waves above described are shown. In Figure 4, the full line 61 represents the voltage which appears across the winding 51. It will be noted that from 62 to 63, the voltage across winding 51 is zero due to the fact that during this portion of the cycle, the current which is 90° out of phase with the voltage, is at its peak and so is the flux. Accordingly, the core is saturated and the winding 51 impedance is zero. The current flowing in the circuit during this interval is shown at 64, 65 (Fig. 5) and the saturating flux at 66 (Fig. 6). During this period, all the voltage appears across 53' and is shown by the dash line 68.

As the current approaches its zero value as at 65 (Fig. 6) which corresponds to value 46 in the hysteresis curve (Fig. 2), the flux collapses almost instantaneously and with further decrease in current builds up in the opposite direction as shown by the line 67 (Fig. 6) which corresponds to 46, 47 on the hysteresis loop (Fig. 2).

During this rapid change in flux, the impedance across winding 51 is very high compared to the impedance of inductance 53' and all the voltage drop of $e_{12}$ is across winding 51. This is shown at 71—72, Fig. 4.

During this period, the current is substantially zero or very slightly above zero, due to the infinite impedance of winding 51. This is shown at 65—73. During this period of the cycle, while the current remains at the same value, 46—47 in Fig. 2 and 65—73 in Fig. 5, the flux is reversed as at 67 (Fig. 6).

With the core again saturated at 75, the reactance of winding 51 is substantially zero and the voltage there drops to 76.

This can also be explained mathematically as follows: During the non-saturated period of core 52 all of the voltage $e_{12}$ is applied to the winding 51. The voltage across $e_{51}$ may then be stated as $$e_{51} = -N \frac{d\Phi}{dt} 10^{-8} \qquad (2)$$

in which $e_{51}$ is the voltage across winding 51
$N$ is the number of turns in winding 51
$\Phi$ is the flux in core 52

From Equation 2 follows:

$$e_{51}dt = -N10^{-8}d\Phi \qquad (3)$$

Integrating both sides $$\int_{t_1}^{t_2} e_{51}dt = -N^{-8}\int_{t_1}^{t_2} d\Phi \qquad (4)$$

in which $t_1$ and $t_2$ may be any chosen time intervals.

Integrating the Equation 4 for a range of time of ½ cycle $(0-\pi)$ of the voltage $e_{12}$ on the series capacitor $$\int_0^{\pi} e_{51}dt = -N^{-8}[\Phi(t_2)-\Phi(t_1)] \qquad (5)$$

$$\Phi(t_2) = -\Phi_{max} \text{ and } \Phi(t_1) = +\Phi_{max}$$

$$\int_0^{\pi} e_{51}dt = -N10^{-8}[-\Phi_{max}-\Phi_{max}] \qquad (6)$$

$$= +2N10^{-8}\Phi_{max}$$

or $$\int_0^{\pi} e_{51}$$

is a constant for all values of current in the main line.

Equation 6 demonstrates that the average voltage-time area during each half cycle appearing across winding 51 is constant and depends only on the magnetic characteristics of the transformer 52. Therefore, the average value of the rectified output voltage of transformer 53 (i. e. the D. C. voltage in conductor 76) is constant and independent of fluctuations of current and voltage in the main line 11.

In the above, a load current of a value sufficient to generate a predetermined voltage drop across capacitor 12 is required. This lower limit of the voltage drop is attained when the voltage-time area 63, 71, 72, 76 in Figure 4 covers the whole half of a cycle. The reactances of transformer 51 and reactor 53' are made such as to have this lower limit coincide with the voltage drop at rated load. As the tripping system is not required to operate below the rated load, the fact that the bias current is not constant below that limit becomes immaterial. It can be shown that the bias current below that limit is proportional to the load current.

The transformer 52 is provided with a secondary 53, one terminal of which is connected to a variable resistor 54 and having an opposite terminal connected to a full wave rectifier 55 of well known construction.

The opposite input terminal of the rectifier 55 is connected to the adjusting terminal of the variable resistor. The output circuit of the full wave rectifier is connected to the smoothing condenser 56 and over the circuit including an inductance 57 to the biasing windings 34 and 35.

The current flowing in the secondary 53 may be set at any desired value by the setting on the variable resistor 54. Current flowing as a result of the voltage induced in the secondary 53 flows, during one-half cycle, through the rectifier elements 71 and 72 and, during the other half-cycle, through elements 73 and 74.

The rectifier current in the output circuit of this rectifier is smoothed by the capacitor 56 and inductance 57 and accordingly an output is obtained across terminals 75 and 76 which is of substantially constant voltage and constant current and biases the windings 34 and 35 to saturate the cores thereof to a fixed point 41 (Fig. 2) irrespective of fluctuations in the main line.

From the above, the operations will now be clear. When normal load currents flow over the line 11, fluctuating voltages appear across the series capacitor 12 in accordance with the fluctuating currents in the conductor 11. These fluctuating voltages will, however, so energize the transformer 52 as to produce a constant output voltage in the secondary 53 which constant voltage in this circuit will cause a constant biasing current to flow through the biasing windings 34 and 35 of the transformers 31 and 30 respectively.

This biasing current will bias the transformers 31 and 30 to a saturated flux value 41 (Fig. 2). At this flux saturation, the normal load current alternations flowing through the primary windings 32 and 33 will produce no flux change in either transformers 30 or 32.

In Figure 7, the biasing current $i_{34}$ flowing in the winding 34 is shown as a constant value. Superimposed therein is the current $i_{32}$ flowing in winding 32. The current for just saturating the core is shown by the dash line 80. It will be observed that the superimposed current $i_{32}$ normally does not extend beyond this saturated value and accordingly no change in the flux in the transformer occurs.

When during any cycle, however, the current amplitude varies beyond the above prescribed limits, a flux change beyond the value at 46 (Fig. 2) will occur in either transformer 30 or 31 depending upon whether the change occurred during the positive or negative half of the cycle. This is also shown by the current $i_{32}$ crossing the saturation value 80 at 81 Fig. 7.

As a result of the sudden change of flux in the respective transformer core, the corresponding secondary 29 or 28 of the transformers 30 and 31 will be energized and a pulse voltage $E_{29}$ (Fig. 8) will appear at the auxiliary electrode 25 sufficient to break down the arc of the spark gap 18 providing thereby a bi-pass circuit around the capacitor 12. This arc is now maintained at a relatively low $e_{12}$ voltage. Near the end of the cycle, however, the voltage as it approaches zero at the spark gap electrodes 22 and 23. 26 will extinguish the spark gap and the bi-pass for the capacitor 12 is reopened. If in the subsequent cycle, however, the same fault current condition still obtains, the above described cycle of operations will again be repeated.

While I have described a preferred form of my invention, it will be clear that the invention may be carried out with other current arrangements coming within the scope of the present invention. Thus, although I have shown a switching circuit which is electro-magnetically operated during each half cycle, I may within the spirit of my invention, trigger on one-half cycle either positive or negative and thereby save one of the two transformers 32 or 33.

In Figure 9, I have shown a modified form for carrying out my invention in which I utilize the change in reactance of the primary windings 32 and 33 directly for controlling a common transformer 91 to produce the desired pulse at the arc gap. When line current reaches fault current values, the change in reactance of the windings 32 and 33, as the core reaches the steep portion of the hysteresis loop, will produce a pulse which induces a pulse voltage in the secondary of the transformer 91 to operate the auxiliary electrode of the spark gap in the manner which has already been described above. In the above, the remaining portions of the system, that is, the means for producing the biasing current through the biasing windings being the same as described in the main modification have not been redescribed here.

In Figure 10, I have shown a further modified form of my invention, in which I use gas tubes in place of the arc gap. Here, as in the first embodiment, the transformers 30 and 31 are provided with primary windings and secondary windings and with a biasing winding. The output, however, of the secondary transformer 31 is connected to the control electrode 101 of the gas tube 102. The anode 103 and the cold cathode 104 provide, when a gaseous discharge is completed, a bi-pass circuit around the main line condenser, as will be apparent when the potential applied at 101 is sufficient to break down; a gaseous discharge across electrodes 103 and 104 and current flows around the main line condenser correspondingly in the opposite half cycle, the control electrode 105 is applied thereto, necessary for breaking down the gas tube 106; a discharge occurs between the electrode 107 and the cold cathode 108 to complete a bi-pass circuit. As in the case of Fig. 1, this discharge will continue so long as the potential on the anode is sufficient to maintain the arc and will be extinguished at the end of the cycle as the voltage goes through zero.

In Figure 11, I have shown a still further modification in which I have eliminated the secondary of the transformers 30 and 31. When there is a voltage drop across the coil 111, due to a fault current and described hereinbefore, a signal will go through the primary winding 112 of the transformer 113 and the secondary 114, one terminal of which is connected to control electrode 115, will effect a breakdown of the discharge tube 116 between its anode 117 and the cold cathode 118. This occurs during one half cycle and in the event the fault occurs in the other half cycle the coil 121 will effect energization of primary 122 of transformer 123. The pulse induced in the secondary 124 will thereupon apply a breakdown voltage to the control electrode 125 of the gas tube 126 and effect a breakdown between the anode 127 and the cold cathode 128.

Although I have shown a preferred arrangement for securing a constant biasing current for windings 34 and 35, I may use any other means for attaining such a current.

While I have shown specific spark gaps which are broken down by a pulse voltage, I may use any other form of spark gap and indeed may, if desired, use gaseous discharge tubes such as ignitrons connecting conductor 27 to the igniting electrodes.

It will also be apparent that for very high voltage systems, I may use several spark gaps or ignitrons in series, each tripped by its own tripping winding in the impulse transformer.

I claim:

1. In a series capacitor protective system for an alternating current circuit having a series capacitor connected therein, a bi-pass circuit around said capacitor including a discharge device having main electrodes and a control electrode for breaking down said discharge device, a reactor having a main winding, said reactor main winding connected in parallel with said series capacitor, a biasing winding connected to bias said reactor to a saturating value at which the cyclical load currents flow from said protected circuit does not change the flux in said reactor, the currents from said protected line when they exceed load values producing sudden flux changes in said reactor a secondary winding for said reactor and circuit connection from said secondary winding to said control electrode energized when the flux in said reactor changes for effecting a breakdown of said main electrodes to provide a bi-pass circuit through said discharge device around said series capacitor.

2. In an alternating current circuit for protecting a series capacitor connected in series with a line, a spark gap connected aross said capacitor and normally presenting an open circuit, said spark gap including main arcing electrodes and an auxiliary electrode, a transformer having primary and secondary windings, said secondary winding connected to said spark gap auxiliary electrode and circuit connections including said primary winding connected across said series capacitor, said transformer having a core which becomes saturated at relatively low current values and has a steep hysteresis loop characteristic, means for normally maintaining said transformer in its saturated range for normal full range of load currents in said line, said primary winding operating said transformer to the flux changing point of said transformer in response to currents in said line above a predetermined value for inducing a voltage in said secondary winding, said secondary winding connection to said spark gap auxiliary electrode effecting a break-down of said spark gap when said primary winding is energized to points beyond the saturation points of said transformer core.

3. In an alternating current system for protecting a series capacitor of an energy-conducting system, a spark gap having a pair of main electrodes and an auxiliary electrode interposed between said main electrodes, circuit connections including said spark gap connected in shunt with the series capacitor being protected, a transformer having a primary and a secondary, circuit connections including said primary winding extending across said series capacitor, the voltage across said series capacitor appearing across said primary winding, said transformer having a core material having a hysteresis loop which is saturated by relatively low current and has a steep flux change characteristic, a biasing winding for said transformer, means including circuit connections for producing current flow in said biasing winding to bias said transformer to a saturation point at which the normal current fluctuations in said primary superimposed on said biasing currents maintain the flux in the range of saturation of said transformer core whereby fluctuation in primary current normally produces no fluctuations of the flux in the core of said transformer, the flux in said transformer being varied only when the currents in the main line extend beyond said predetermined value and means including circuit connections from the secondary windings of said transformer to said auxiliary electrode for effecting a break-down of said spark gap when the current values in the main line extend beyond said predetermined value.

4. In an alternating current system for protecting a series capacitor of an energy-conducting system, a gap having a pair of main electrodes and an auxiliary electrode interposed between said main electrodes, circuit connections including said gap connected in shunt with the series capacitor being protected, a transformer having a primary and a secondary, circuit connections including said primary winding extending across said series capacitor, the voltage across said series capacitor appearing across said primary winding, said transformer having a core material having a hysteresis loop which is saturated by relatively low current and has a steep flux change characteristic, a biasing winding for said transformer, means including circuit connections for producing current flow in said biasing winding to bias said transformer to a saturation point at which the normal current fluctuations in said primary superimposed on said biasing currents maintain the flux in the range of saturation of said transformer core whereby fluctuations in primary current normally produces no fluctuations of the flux in the core of said transformer, the flux in said transformer being varied only when the currents in the main line extend beyond said predetermined value and means including circuit connections from the secondary windings of said transformer to said auxiliary electrode for effecting a break-down of said gap when the current values in the main line extend beyond said predetermined value.

5. In an alternating current system for protecting a series capacitor of an energy-conducting system, a spark gap having a pair of main electrodes and an auxiliary electrode interposed between said main electrodes, circuit connections including said spark gap connected in shunt with the series capacitor being protected, a transformer having a primary, a secondary and an auxiliary winding, circuit connections including said primary winding extending across said series capacitor, the voltage across said series capacitor appearing across said primary winding, said transformer having a core material having a hysteresis loop which is saturated at normal current values flowing in the main system, means including circuit connections for generating currents in said auxiliary winding to bias said transformer to a saturation point at which the normal current fluctuates superimposed on said bias to remain in the range of saturation of said transformer core whereby fluctuation in current normally produces no fluctuations of the flux in the core of said transformer, the flux in said transformer being varied only when the currents in the main line extend beyond said predetermined value and means including circuit connections from the secondary windings of said transformer to said auxiliary electrode for effecting a break-down of said spark gap when the current values in the main line extend beyond said predetermined value.

6. In an alternating current system for protecting a series capacitor of an energy-conducting system, a gas tube having a pair of main electrodes and an auxiliary electrode interposed between said main electrodes, said main electrodes being connected in shunt with the series capacitor being protected, a transformer having a primary and a secondary, circuit connections including said primary winding extending across said series capacitor, the voltage across said series capacitor appearing across said primary winding, said transformer having a core material having a hysteresis loop which is saturated by relatively low current and has a steep flux change characteristic, a biasing winding for said transformer, means including circuit connections for producing current flow in said biasing winding to bias said transformer to a saturation point at which the normal current fluctuations in said primary superimposed on said biasing currents maintain the flux in the range of saturation of said transformer core whereby fluctuation in primary current normally produces no fluctuations of the flux in the core of said transformer, the flux in said transformer being varied only when the currents in the main line extend beyond said predetermined value and means including circuit connections from the secondary windings of said transformer to said auxiliary electrodes for effecting a break-down of said gas tube when the current values in the main line extend beyond said predetermined value.

7. In a circuit for protecting a series capacitor connected in series with a line, a gas tube having main electrodes connected across said capacitor and normally presenting an open circuit and a control electrode for controlling breakdown of said gas tube, a transformer having primary and secondary windings, said secondary winding being connected to said gas tube control electrode and circuit connections including said primary winding connected across said series capacitor, said transformer having a core which becomes saturated at current values and has a steep hysteresis loop characteristic, biasing means for normally maintaining said transformer in its saturated range for normal full range of load currents in said line, said primary winding when energized in response to fault currents in said line operating said transformers to the flux changing point of said transformers for inducing a voltage in said secondary, said secondary connection to said gas tube control electrode effecting a break-down of said gas tube main electrodes when said primary winding is energized to points beyond the saturation points of said transformer core.

EDWARD JOHN DIEBOLD.

References Cited in the file of this patent

UNITED STATES PATENTS

| Number | Name | Date |
| --- | --- | --- |
| 1,715,684 | Thomas | June 4, 1929 |
| 1,784,030 | Sorensen | Dec. 9, 1930 |
| 1,905,226 | Hoard | Apr. 25, 1933 |
| 1,995,530 | Askey | Mar. 26, 1935 |
| 2,040,768 | Edwards | May 12, 1936 |
| 2,207,577 | Buell | July 9, 1940 |
| 2,307,598 | Marbury | Jan. 5, 1943 |
| 2,363,898 | Partington | Nov. 28, 1944 |
| 2,389,007 | Strang et al. | Nov. 13, 1945 |
| 2,395,881 | Klemperer | Mar. 5, 1946 |

FOREIGN PATENTS

| Number | Country | Date |
| --- | --- | --- |
| 303,742 | Italy | Dec. 15, 1932 |